Nov. 25, 1930.  F. M. SMITH  1,783,172
ATTACHMENT FOR CALCULATING MACHINES
Filed March 25, 1930  2 Sheets-Sheet 1
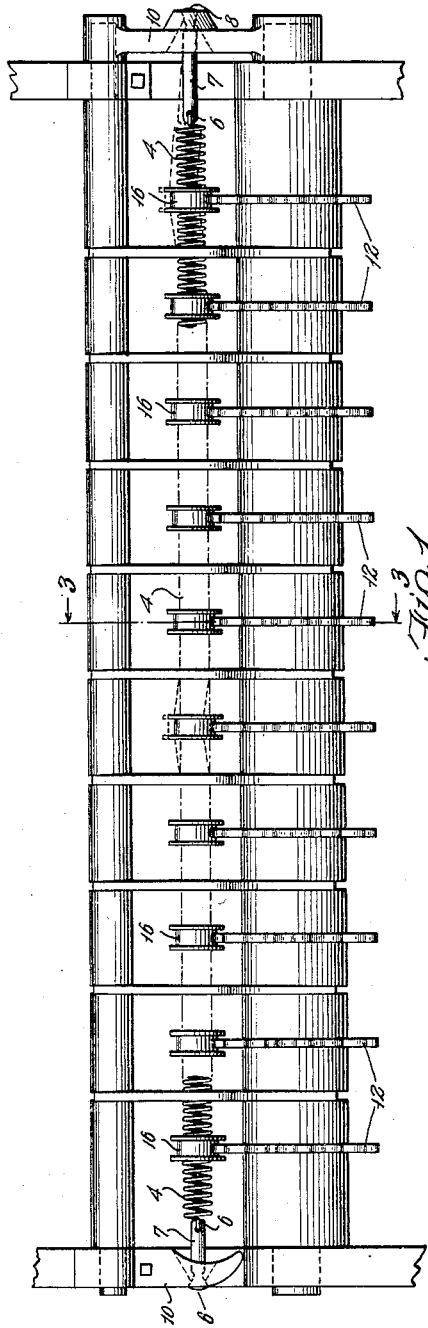
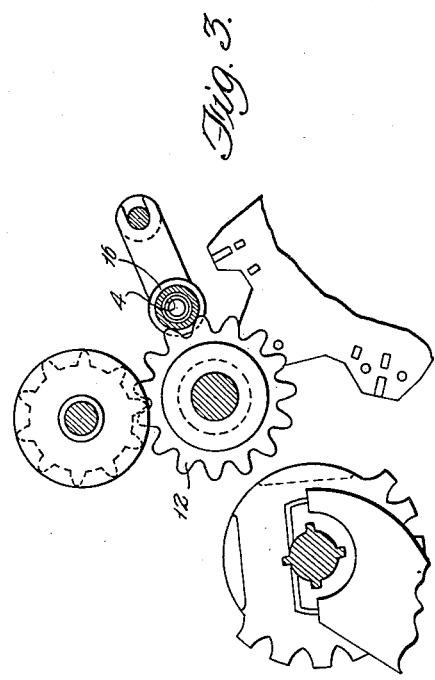
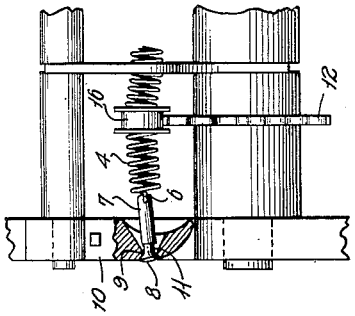
Inventor
Frank M. Smith,
By E.W. Anderson Son
Attorney

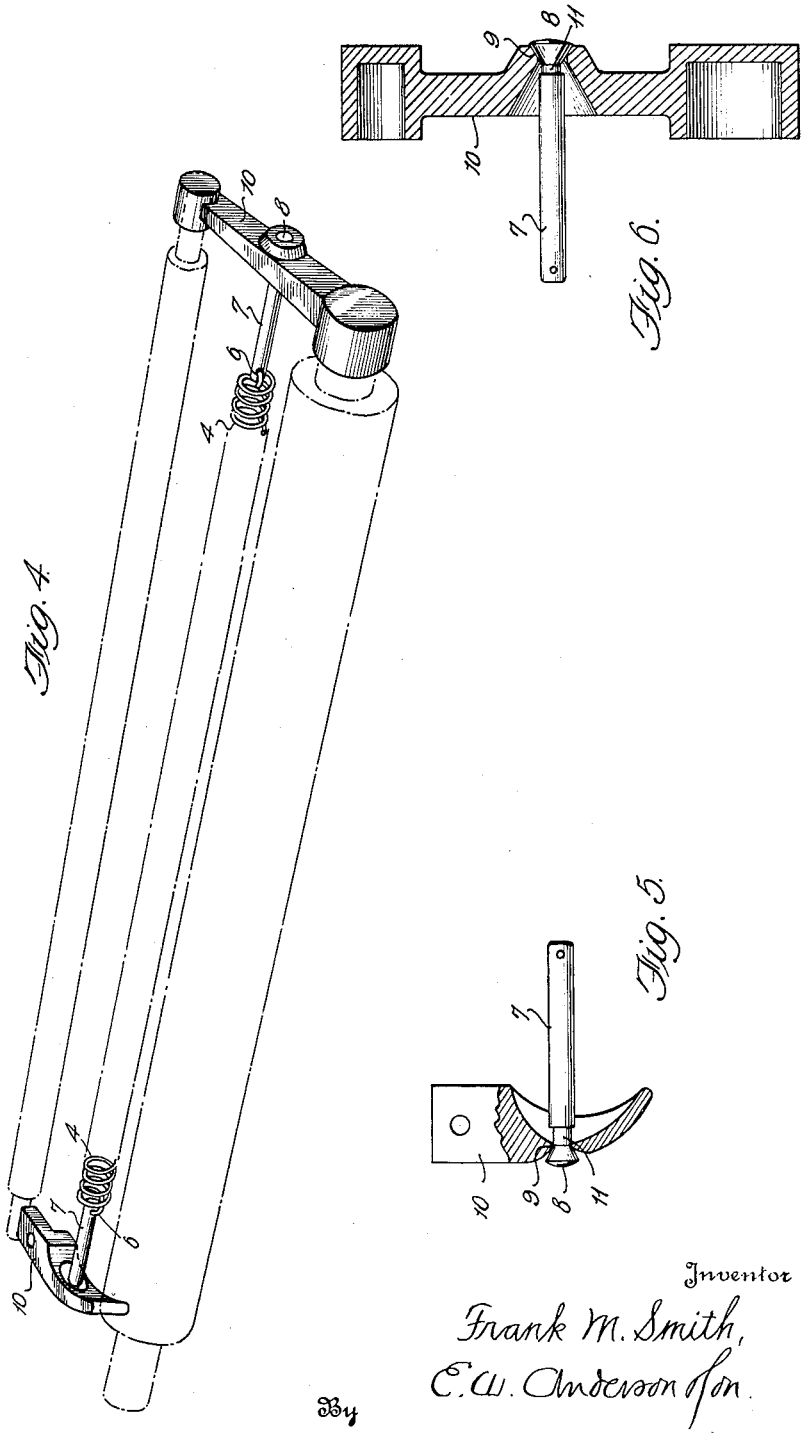

Patented Nov. 25, 1930

1,783,172

UNITED STATES PATENT OFFICE

FRANK M. SMITH, OF WEST ORANGE, NEW JERSEY, ASSIGNOR TO MONROE CALCULATING MACHINE COMPANY, OF ORANGE, NEW JERSEY, A CORPORATION OF DELAWARE

ATTACHMENT FOR CALCULATING MACHINES

Application filed March 25, 1930. Serial No. 438,806.

The invention has relation to calculating machines, and particularly to means or checks for preventing over rotation of the rapidly moving wheels or gears, having for an object to provide certain improvements upon the device of the patent to Phinney, dated August 17, 1920, and numbered 1,349,628.

It is found in practice that the check spring of this patent has a comparatively short life, crystallization of the metal being set up by the constant distortion of the coils of the spring in a single radial direction in the rotation of the intermediate gears. It is an object of the present invention to avoid crystallization of the metal and to increase the life of the spring.

The invention consists in the novel construction and combinations of parts as set forth in the appended claims.

In the accompanying drawings illustrating an embodiment of the invention:

Fig. 1 is a plan view of the invention as applied.

Fig. 2 is a similar fragmentary view of one end of the device showing the distortion of the spring in the movement of an intermediate gear and the pivotal movement of a swivel pin.

Fig. 3 is a section on the line 3—3, Fig. 1 showing a selector gear and part of the carry mechanism.

Fig. 4 is a perspective view of the invention, with the intermediate gear shaft and carry wedge support shaft in dotted lines.

Fig. 5 is a detail sectional view of the left hand end support showing the swivel pin engaged therewith.

Fig. 6 is a similar view of the right hand end support.

In these drawings the numeral 4 designates the coiled check spring, having an eye or hook 6, at each end thereof, engaging right and left swivel pins 7, having outer heads 8, engaging apertures 9 of right and left end supports 10, said apertures flaring inwardly, and said heads having curved wall necks 11 fitting in the apertures or seats 9.

The right hand end support 10 has the carry wedge support shaft engaged with one end thereof and the shaft for the intermediate gears 12 engaged with the other end thereof, whereas the left hand end support is not engaged by the shaft of the intermediate gears but has the form of a hook.

The check spring 4 is shown as provided with rollers 16 rotatably mounted thereon and engaged by the teeth of the intermediate gears, but these rollers are not essential. Stiffener plates 10' for the check spring are provided between the intermediate gears 12.

In the rotation of the intermediate gears 12 driven by the selector gears 5 in the operation of the machine, the check spring will be slightly distorted at the point of engagement with the intermediate gear, which will through friction cause rotation of the check spring and swivel pins as a unit.

The check spring is stretched or extended longitudinally before having its end eyes engaged with the end supports 10, whereby the coils of the spring are moved from contact with each other and the spring stiffened or tensioned.

The slight distortion to which the spring is subjected in the rotation of the intermediate gears, is transmissible through the coils of the spring, so that one or both of the swivel pins may be moved pivotally in their seat or seats, as well as rotatably moved.

The rotation of the check spring will cause the same to present itself to the succeeding tooth or teeth of the intermediate gear at different radial points in the spring, the engagement of the teeth of the intermediate gear against the spring being against a different radial part of the coil for each tooth, whereby the radial distortion of the coil is in as many different directions radially relative to the spring as there are teeth in the intermediate gear.

I claim:

1. In a calculating machine having a shaft provided with a longitudinal series of spaced gears, and a coiled check spring parallel to said shaft and engaging the teeth of said gears; means for preventing crystallization of said spring including means for rotatably supporting and holding said spring extended longitudinally.

2. In a calculating machine having a shaft provided with a longitudinal series of spaced gears, and a coiled check spring parallel to said shaft and engaging the teeth of said gears; means for preventing crystallization of said spring including swiveled means for rotatably supporting and holding said spring extended longitudinally.

3. In a calculating machine having a shaft provided with a longitudinal series of spaced gears, and a coiled check spring parallel to said shaft and engaging the teeth of said gears; means for preventing crystallization of said spring including means for rotatably supporting and holding said spring extended longitudinally having end supports and swivel pins seated in said supports and engaging the ends of the spring.

Signed at Orange, in the county of Essex and State of New Jersey, this 8 day of March A. D. 1930.

FRANK M. SMITH.